United States Patent
Kairis, Jr.

(10) Patent No.: US 7,103,852 B2
(45) Date of Patent: Sep. 5, 2006

(54) DYNAMIC RESIZING OF CLICKABLE AREAS OF TOUCH SCREEN APPLICATIONS

(75) Inventor: Richard J. Kairis, Jr., Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 739 days.

(21) Appl. No.: 10/384,987

(22) Filed: Mar. 10, 2003

(65) Prior Publication Data

US 2004/0178994 A1 Sep. 16, 2004

(51) Int. Cl.
*G06F 3/00* (2006.01)
*G09G 5/00* (2006.01)

(52) U.S. Cl. .............. 715/800; 345/175; 345/173
(58) Field of Classification Search ........... 715/800; 345/173, 175
See application file for complete search history.

(56) References Cited

U.S. PATENT DOCUMENTS

| | | | |
|---|---|---|---|
| 4,790,028 A | | 12/1988 | Ramage |
| 5,119,079 A | * | 6/1992 | Hube et al. ............ 715/823 |
| 5,565,894 A | * | 10/1996 | Bates et al. ............ 345/178 |
| 5,627,567 A | * | 5/1997 | Davidson .............. 345/173 |
| 5,877,751 A | | 3/1999 | Kanemitsu et al. |
| 5,956,020 A | * | 9/1999 | D'Amico et al. ......... 345/173 |
| 6,073,036 A | * | 6/2000 | Heikkinen et al. ....... 455/550.1 |

FOREIGN PATENT DOCUMENTS

EP 0965925 12/1999

OTHER PUBLICATIONS

"Algorithm for Decreasing the Error Rate of Data Entered on a Touch-Sensitive Terminal," IBM Technical Disclosure Bulletin, vol. 33, No. 10A, Mar. 1991, pp. 223-227.

* cited by examiner

*Primary Examiner*—Weilun Lo
*Assistant Examiner*—Shashi Becker
(74) *Attorney, Agent, or Firm*—Sawyer Law Group LLP

(57) ABSTRACT

A method for increasing ease-of-use of a touch screen application by dynamically resizing touch screen input areas is disclosed. The touch screen application includes a user interface that displays one or more touch screen input areas. Each of the touch screen input areas include a viewable area and a clickable area, wherein a user's touch of the clickable area activates the corresponding touch screen input area. Aspects of the present invention include collecting coordinates of touches on the display in response to user interaction, and analyzing the touch coordinates to determine how often the user has missed the input areas. In response to the number of missed touches reaching a predetermined threshold, both the size of the viewable area and the clickable area of at least one of the input areas, and possibly all areas of a similar size or type, are increased so that the input areas will be easier to touch.

24 Claims, 5 Drawing Sheets

DYNAMIC RESIZING OF CLICKABLE AREAS OF TOUCH SCREEN APPLICATIONS

FIELD OF INVENTION

The present invention relates to displaying user interfaces for touch screen application, and more particularly to a method and system for dynamically resizing touch screen input areas to aid user interaction.

BACKGROUND

Most software applications are designed to be used with only one pointing device, such as a mouse or stylus. Touch screen applications, however, are typically designed to be used with a variety of pointing devices, such as a user's finger, and various types of styluses. Devices that run such touch screen applications are becoming increasingly smaller in size and have small LCD's on which to display the user interface of the touch screen applications. Examples of such devices include ATMs, PDAs, and cellphones, for instance. Therefore, many touch screen applications are difficult to use. Even well designed touch screen applications can be difficult to use by someone with large fingerprints or diminished motor skills.

U.S. Pat. No. 5,119,079 discloses a touch screen user interface for a reprographic machine that expands the area of a touch zone on a touch screen when selected to improve accuracy of selection thereof. Although this system is beneficial to the user, the system will not aid the user who continually misses the intended touch zone, the touch zone is expanded only after selected by the user.

Accordingly, what is needed is an improved method and system for increasing the ease-of-use of a touch screen application.

SUMMARY

The present invention provides a method and system for dynamically resizing touch screen input areas to increase the ease-of-use of a touch screen applications. The touch screen application includes a user interface that displays one or more touch screen input areas. Each of the touch screen input area include a viewable area and a clickable area, wherein a user's touch of the clickable area activates the corresponding touch screen input area. Aspects of the present invention include collecting coordinates of touches on the display in response to user interaction, and analyzing the touch coordinates to determine how often the user has missed the input areas. In response to the number of missed touches reaching a predetermined threshold, both the size of the viewable area and the clickable area of at least one of the input areas, and possibly all areas of a similar size or type, are increased so that the input areas will be easier to touch.

DETAILED DESCRIPTION

The present invention relates to a method and system for dynamically resizing touch screen input areas to aid user interaction. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
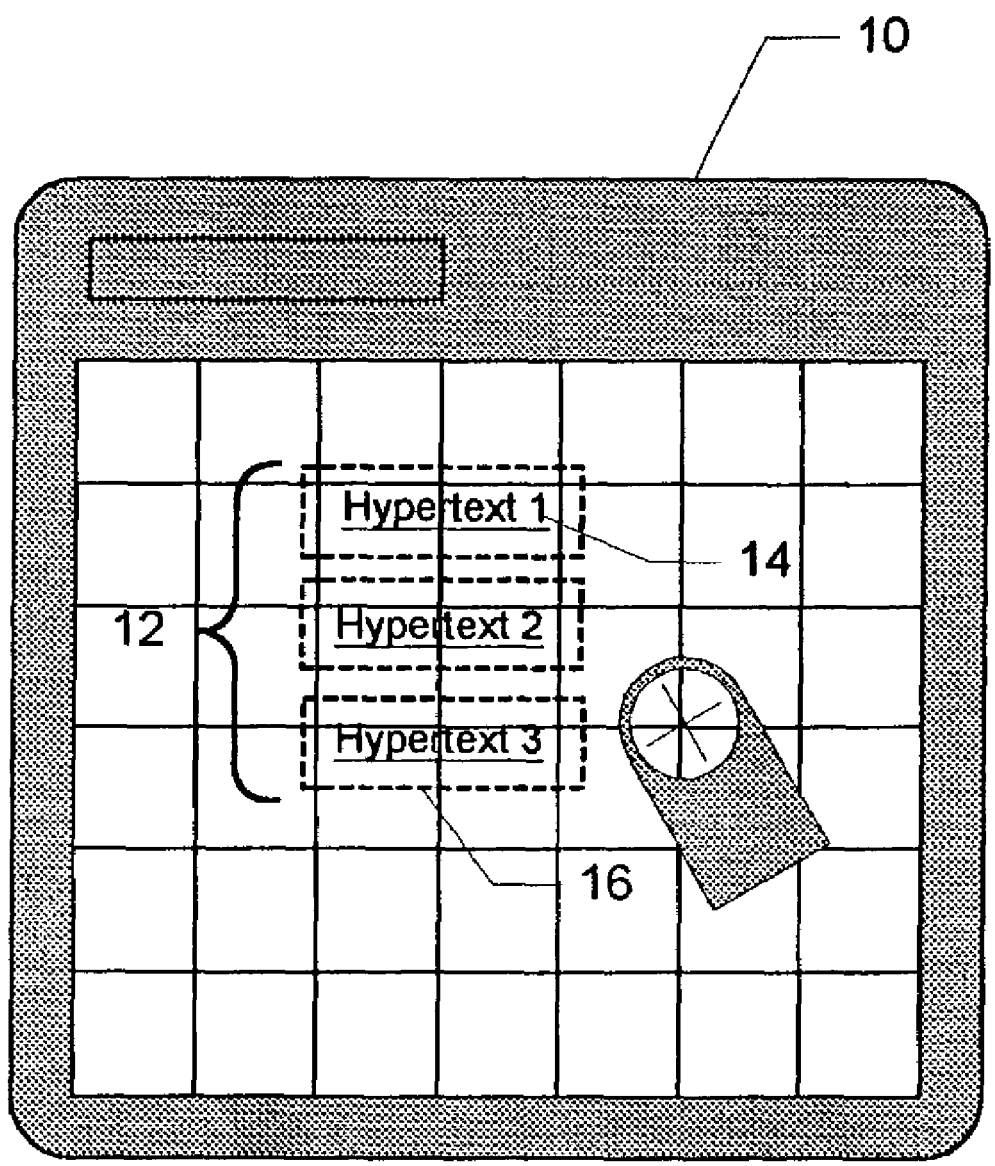
FIG. 1 is a diagram illustrating an example user interface of a conventional touch screen application.

FIG. 1 is a diagram illustrating a user interface of a conventional touch screen application. The touch screen application user interface 10 is shown displaying one or more touch screen input areas 12, each of which includes a viewable area 14 that is displayed to the user, and a clickable area 16 that will activate the corresponding input area 12 when touched. In this example, the touch screen input areas 12 are shown as hypertext links, but may also include buttons and other types of icons. When the touch screen input areas 12 are displayed in relatively small size, a user may have difficulty accurately touching or clicking on the intended input area 12, particularly when a large stylus, such as a finger, is used.

The present invention provides a method and system for increasing the ease-of-use of a touch screen application by increasing the size of a touch screen input area 12 in response to how often a user fails to click on the intended input area 12. The present invention analyzes both the frequency and the distance missed by finger or stylus touches on the touch screen that do not fall within the input areas 12, and compares the sizes of the input areas 12 to the distances of the missed touches from the input areas 12. If there continue to be missed touches, then the sizes of the input areas 12 are automatically increased in proportion to the distances of the missed touches to make the input areas 12 easier for the user to click on, thereby improving user interaction with the touch screen application.

Figure 2:
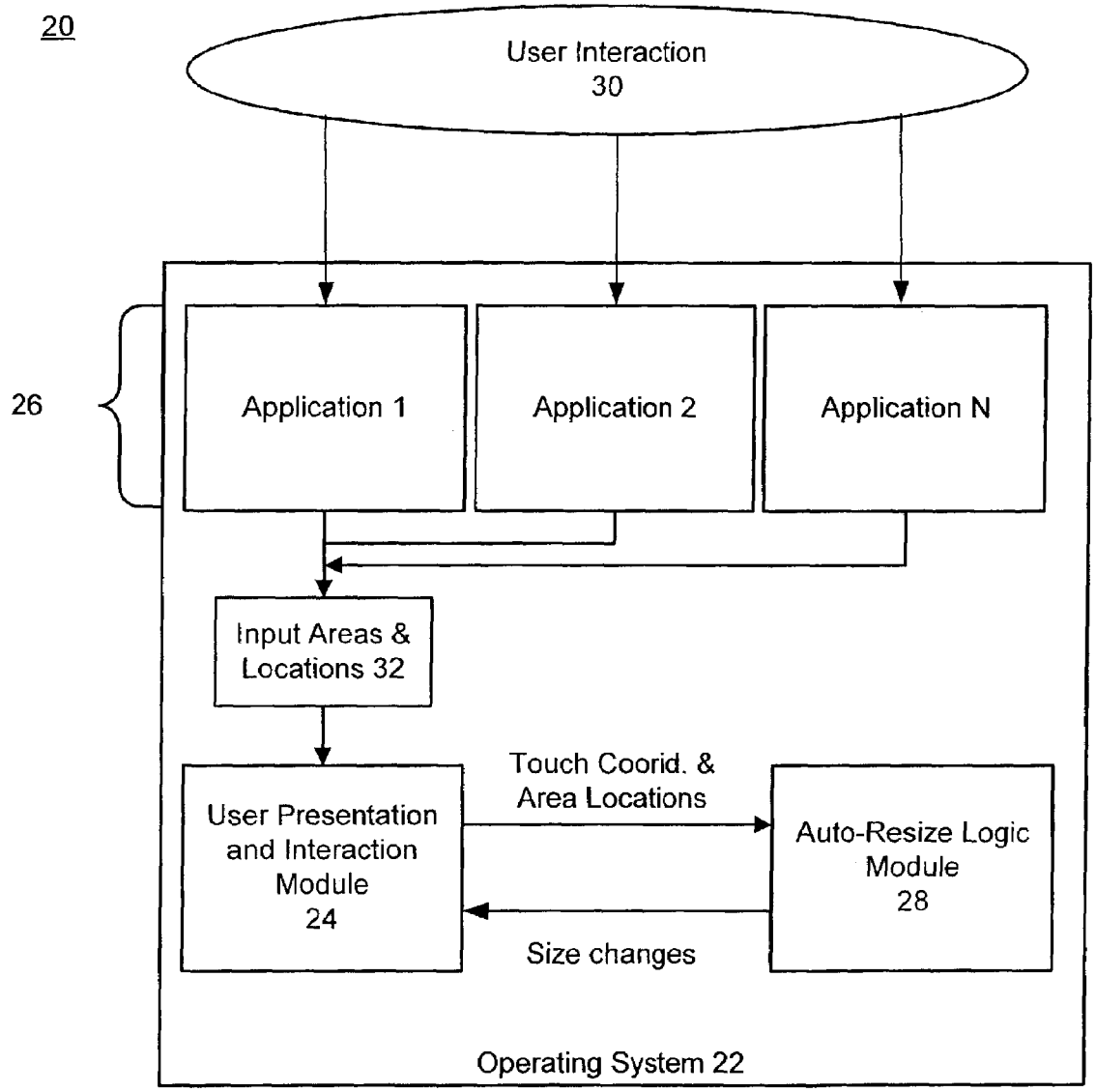
FIG. 2 is a block diagram of the software environment for a touch screen computer system having improved ease-of-use in accordance with a preferred embodiment of the present invention.

FIG. 2 is a block diagram of the software environment for a touch screen computer system having improved ease-of-use in accordance with a preferred embodiment of the present invention. The system includes an operating system 22 capable of executing and displaying one or more touch screen application programs 26, a user presentation and interaction module 24, and an auto-resizing logic module 28.

When the touch screen applications 26 are executed, each of the touch screen applications 26 inputs touch screen input areas and their coordinates 32 to the user presentation and interaction module 24 for display on a touch sensitive display (not shown). The user presentation and interaction module 24 then collects coordinates of the touches on the display in response to user interaction 30 and passes the touch coordinates to the auto-resizing logic module 28.

In accordance with the present invention, the auto-resizing logic module 28 analyzes the touch coordinates to determine how often the user has missed the input areas 12 and increases the size of the input areas 12 when the number of misses passes a predetermined threshold so that the input areas 12 will be easier to click on.

Figure 3:
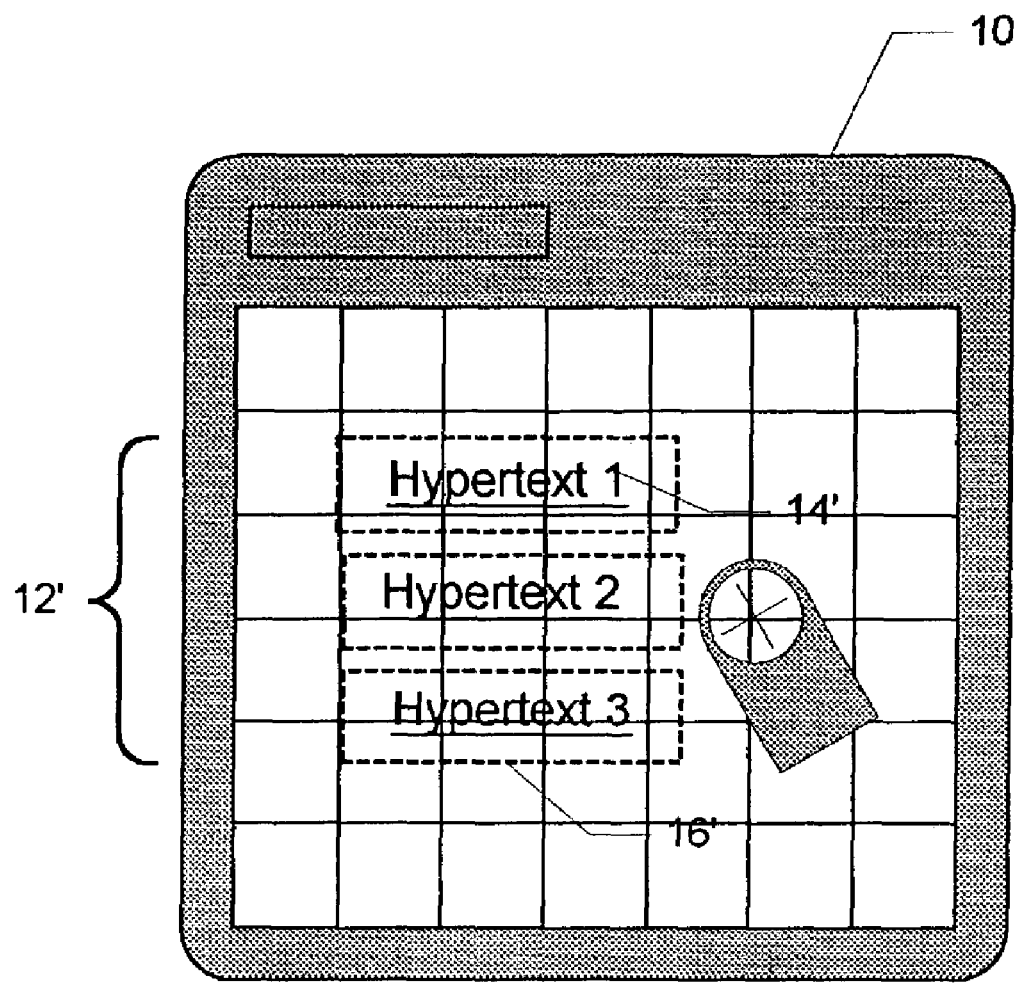
FIG. 3 is a diagram illustrating an example the user interface of a touch screen application in which the input areas have been enlarged in accordance with the present invention.

After the auto-resize logic module 28 detects a predetermined threshold of failed touches has been exceeded, then the auto-resize logic module 28 submits size changes to the user presentation and interaction module 24, and the input areas 12 will be displayed larger than original as shown in FIG. 3.

By enlarging the input areas after the a predetermined threshold of failed touches has been exceeded by the user, the system aids the user in making more accurate selections, thereby making the touch screen application easier to use.

Figure 4:
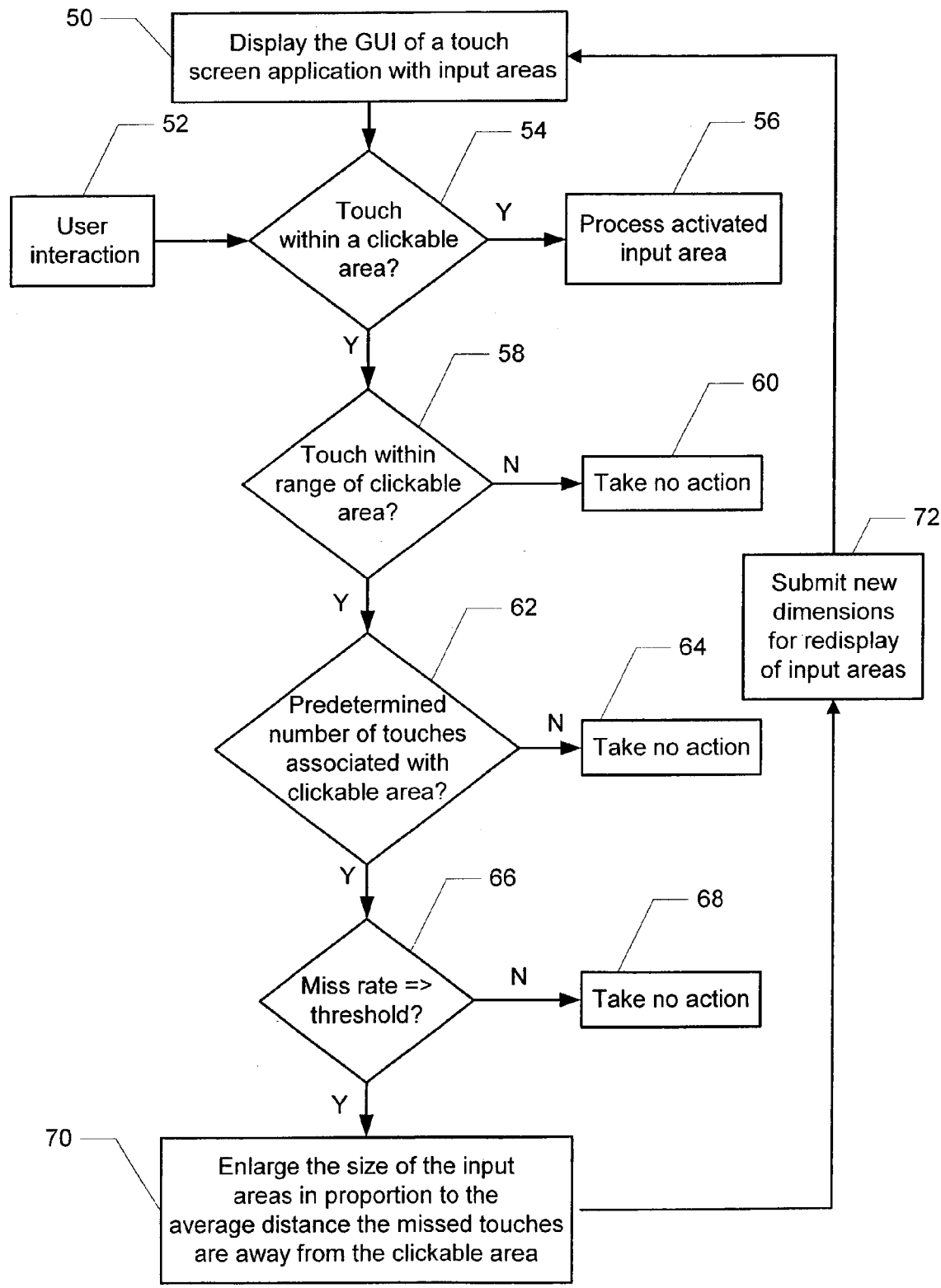
FIG. 4 is a flowchart illustrating the process for dynamically increasing the size of touch screen application input areas in accordance with a preferred embodiment of the present invention.

FIG. 4 is a flowchart illustrating the process for dynamically increasing the size of touch screen application input areas in accordance with a preferred embodiment of the present invention. The process begins by displaying the GUI of a touch screen application with input areas in step 50. In response to user interaction step 52, it is determined in step 54 whether the touch landed within the coordinates of a clickable area. If so, then in step 56, the selected input area 12 is activated and processed by the application 26.

If it is found that the touch failed to land within a clickable area in step 54, then in step 58, it is determined whether the user's touch is within a predetermined range of the clickable area 16 (i.e., a near miss). If so, then in step 60, no action is taken. The predetermined range could be a percentage or multiple of the narrowest dimension of the clickable area 16 beyond the clickable area 16 in each direction.

Figure 5:
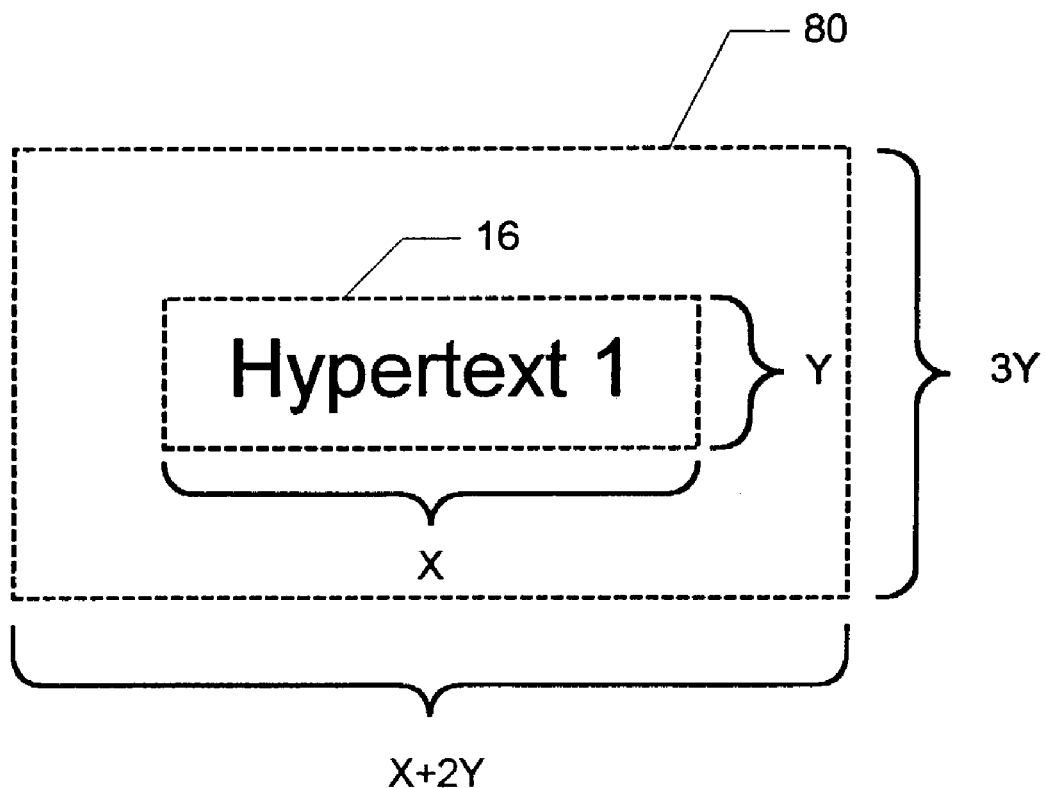
FIG. 5 is a diagram illustrating a range boundary around a clickable area for determining whether a touch is a near miss.

FIG. 5 is a diagram illustrating a range boundary around a clickable area for determining whether a touch is a near miss. Assume that the clickable area 16 is X pixels wide by Y pixels high. Y is the narrowest dimension so the range boundary 80 surrounding the clickable area 16 is a box that is a multiple of Y in each direction beyond the clickable area 16. In this example, the multiple is 1, so that the range boundary 80 will extend Y pixels past the left, right, top and bottom of the clickable area 16. Therefore, the overall width for the range boundary 80 is X+2Y, and the overall height is 3Y. Touches landing outside the coordinates of the range boundary 80 will be labeled as misses. Touches landing inside the range boundary 80, but outside the clickable area 16, will be labeled as near misses. In the case where one range boundary 80 overlaps another range boundary 80, and a near miss is within both range boundaries 80, then the near miss is associated with both range boundaries 80.

If the touch is determined to be a near miss in step 58, then in step 62 it is determined whether a predetermined number of near misses have been associated with the clickable area 16. If not, then no action is taken in step 64. If yes, then in step 66 it is determined whether the number of near misses, or the miss rate, reaches a predetermined threshold, where the miss rate is defined as a percentage of touches falling outside of the clickable area 16 (but inside the range boundary). If no, then no action is taken in step 68.

If the miss rate has reached the predetermined threshold, then in step 70, at least one of the input areas 12 including (the viewable area 14 and the clickable area 16), is enlarged in proportion to the average distance the missed touches are away from the clickable area 16. For example, if the near misses are offset from the intended input area 12 by 15%, then the size of the input areas 12 may be increased by 15%. In a preferred embodiment, all of the input areas 12 are resized in response to repeated near misses, but in some applications 26, it may preferable to resize only the intended input area 12. In an alternative embodiment, all areas of a similar size or type to the intended input area may also be increased in size.

After the new dimensions for the input areas 12 have been calculated, the auto-resize logic module 28 submits the new dimensions to the user presentation and interaction module 24 for redisplay in step 72, and the process continues as described.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for increasing ease-of-use of a touch screen application, wherein the touch screen application includes a user interface that displays one or more touch screen input areas on a touch sensitive display, each of the touch screen input areas comprising a viewable area and a clickable area, wherein a user's touch of the clickable area activates the corresponding touch screen input area, the method comprising the steps of:
   (a) collecting coordinates of the touches on the display in response to user interaction;
   (b) analyzing the touch coordinates to determine how often the user has missed the input areas; and
   (c) increasing the size of both the viewable area and the clickable area of at least one of the input areas when the number of missed touches reaches a predetermined threshold so that the input areas will be easier to touch.

2. The method of claim 1 wherein step (c) further includes the step of:
   increasing the size of all the input areas.

3. The method of claim 2 wherein step (c) further includes the step of:
   increasing the size of the input areas in proportion to an average distance the missed touches are away from the input areas.

4. The method of claim 3 wherein step (b) further includes the step of:
   determining how often the user has missed each of the input areas.

5. The method of claim 1 wherein step (a) further includes the step of:
   passing the touch screen input areas and their coordinates from the touch screen application to a user presentation and interaction module for display.

6. The method of claim 5 wherein step (a) further includes the step of:
   using the user presentation and interaction module to collect the coordinates of the touches on the display.

7. The method of claim 6 wherein step (b) further includes the step of:
   passing the touch coordinates from the user presentation and interaction module to an auto-resizing logic module for analysis.

8. The method of claim 7 wherein step (c) further includes the step of:
   passing size changes from the auto-resize logic module to the user presentation and interaction module for redisplay of the input areas.

9. A computer-readable medium containing program instructions for increasing ease-of-use of a touch screen application, wherein the touch screen application includes a user interface that displays one or more touch screen input areas on a touch sensitive display, each of the touch screen input areas comprising a viewable area and a clickable area, wherein a user's touch of the clickable area activates the corresponding touch screen input area, the program instructions for:
(a) collecting coordinates of the touches on the display in response to user interaction;
(b) analyzing the touch coordinates to determine how often the user has missed a the input areas; and
(c) increasing the size of both the viewable area and the clickable area of at least one of the input areas when the number of missed touches reaches a predetermined threshold so that the input areas will be easier to touch.

10. The computer-readable medium of claim 9 wherein instruction (c) further includes the instruction of: increasing the size of all the input areas.

11. The computer-readable medium of claim 10 wherein instruction (c) further includes the instruction of: increasing the size of the input areas in proportion to an average distance the missed touches are away from the input areas.

12. The computer-readable medium of claim 11 wherein instruction (b) further includes the instruction of: determining how often the user has missed each of the input areas.

13. The computer-readable medium of claim 9 wherein instruction (a) further includes the instruction of: passing the touch screen input areas and their coordinates from the touch screen application to a user presentation and interaction module for display.

14. The computer-readable medium of claim 13 wherein instruction (a) further includes the instruction of: using the user presentation and interaction module to collect the coordinates of the touches on the display.

15. The computer-readable medium of claim 14 wherein instruction (b) further includes the instruction of: passing the touch coordinates from the user presentation and interaction module to an auto-resizing logic module for analysis.

16. The computer-readable medium of claim 15 wherein instruction (c) further includes the instruction of: passing size changes from the auto-resize logic module to the user presentation and interaction module for redisplay of the input areas.

17. A touch screen computer system, the touch screen computer system capable of executing at least one touch screen application, the touch screen application including a user interface that displays one or more touch screen input areas, each of the touch screen input areas comprising a viewable area and a clickable area, wherein a user's touch of the clickable area activates the corresponding touch screen input area, comprising:
a user presentation and interaction module for receiving the touch screen input areas and their coordinates from the touch screen application, displaying the input areas, and collecting coordinates of the touches on the display in response to user interaction; and
an auto-resizing logic module for receiving the coordinates of the touches from the user presentation and interaction module, analyzing the touch coordinates to determine how often the user has missed the input areas, increasing the size of at least one of the input areas when the number of misses passes a predetermined threshold, and submitting new input area dimensions to the user presentation and interaction module for redisplay.

18. The touch screen computer system of claim 17 wherein the auto-resizing logic module determines that the user's touch is a miss when the touch is outside a predetermined range of the clickable area.

19. The touch screen computer system of claim 18 wherein the predetermined range is calculated through a range boundary formed around the clickable area, wherein touches landing outside coordinates of the range boundary are labeled as misses, and touches landing inside the range boundary, but outside the clickable area, are labeled as near misses.

20. The touch screen computer system claim 19 wherein when one range boundary overlaps another range boundary, and a near miss is within both range boundaries, then the near miss is associated with both range boundaries.

21. A method for increasing ease-of-use of a touch screen application, wherein the touch screen application includes a user interface that displays one or more touch screen input areas, each of the touch screen input areas comprising a viewable area and a clickable area, wherein a user's touch of the clickable area activates the corresponding touch screen input area, the method comprising the steps of:
(a) analyzing the user's touches on the touch screen to determine a miss rate that is based on a percentage of touches that fall outside of the clickable areas; and
(b) in response to the miss rate reaching a predetermined threshold, automatically increasing both the viewable area and the clickable area of at least one of the input areas, thereby making it easier for the user to interact with the touch screen application.

22. method of claim 21 wherein step (a) further includes the step of: when the touch fails to land within the clickable area, determining whether the user's touch is within a predetermined range of the clickable area.

23. The method of claim 22 wherein step (a) further includes the step of:
calculating the predetermined range through a range boundary formed around the clickable area, wherein touches landing outside coordinates of the range boundary are labeled as misses, and touches landing inside the range boundary, but outside the clickable area, are labeled as near misses.

24. The method of claim 23 wherein step (b) further includes the step of:
calculating the miss rate by comparing the number of near misses associated with the clickable area to a predetermined threshold.

* * * * *